United States Patent
Mazumdar et al.

(10) Patent No.: US 10,068,127 B2
(45) Date of Patent: Sep. 4, 2018

(54) AUTOMATIC DETECTION OF FACE AND THEREBY LOCALIZE THE EYE REGION FOR IRIS RECOGNITION

(71) Applicant: IRIS ID, INC., Seoul (KR)

(72) Inventors: Monalisa Mazumdar, Plainsboro, NJ (US); Ravindra Gadde, East Windsor, NJ (US); Sehhwan Jung, Plainsboro, NJ (US)

(73) Assignee: IRIS ID, INC., Seoul (KR)

( * ) Notice: Subject to any disclaimer, the term of this patent is extended or adjusted under 35 U.S.C. 154(b) by 309 days.

(21) Appl. No.: 14/576,389

(22) Filed: Dec. 19, 2014

(65) Prior Publication Data

US 2016/0180147 A1 Jun. 23, 2016

(51) Int. Cl.
*G06K 9/00* (2006.01)
*G06K 9/46* (2006.01)
*G06K 9/52* (2006.01)
*G06K 9/62* (2006.01)

(52) U.S. Cl.
CPC ....... *G06K 9/00248* (2013.01); *G06K 9/0061* (2013.01); *G06K 9/00261* (2013.01); *G06K 9/469* (2013.01); *G06K 9/522* (2013.01); *G06K 9/6297* (2013.01)

(58) Field of Classification Search
None
See application file for complete search history.

(56) References Cited

U.S. PATENT DOCUMENTS

| | | | | |
|---|---|---|---|---|
| 6,714,665 | B1* | 3/2004 | Hanna | G06K 9/00 382/106 |
| 7,203,635 | B2* | 4/2007 | Oliver | G06K 9/6293 345/156 |
| 8,488,023 | B2* | 7/2013 | Bacivarov | G06K 9/00281 348/239 |
| 2003/0118212 | A1* | 6/2003 | Min | G06K 9/00597 382/100 |
| 2003/0123711 | A1* | 7/2003 | Kim | G06K 9/00597 382/117 |

(Continued)

FOREIGN PATENT DOCUMENTS

KR  20130052432 A  5/2013
WO  2011162548 A2  12/2011

OTHER PUBLICATIONS

Real time facial expression recognition in the interactive game based on embedded hidden markov model, by Zhou et al. International conference of computer graphics, 0/7695-2178, Sep. 2004 IEEE.*

(Continued)

*Primary Examiner* — Vikkram Bali
(74) *Attorney, Agent, or Firm* — Loza & Loza, LLP; Heidi Eisenhut

(57) ABSTRACT

An apparatus for automatic detection of the face in a given image and localization of the eye region which is a target for recognizing iris is provided. The apparatus includes an image capturing unit collecting an image of a user; and a control unit extracting a characteristic vector from the image of the user, fitting an extracted vector into a Pseudo 2D Hidden Markov Model (HMM), and an operating method thereof for detecting a face and facial features of the user.

9 Claims, 6 Drawing Sheets

(56) References Cited

U.S. PATENT DOCUMENTS

| | | | | |
|---|---|---|---|---|
| 2003/0212552 A1* | 11/2003 | Liang | ............ | G10L 15/25 704/231 |
| 2003/0212557 A1* | 11/2003 | Nefian | ............ | G10L 15/25 704/256.2 |
| 2005/0129331 A1* | 6/2005 | Kakiuchi | ............ | G06T 7/408 382/275 |
| 2007/0268312 A1* | 11/2007 | Marks | ............ | A63F 13/06 345/633 |
| 2013/0005443 A1* | 1/2013 | Kosta | ............ | G07F 17/3206 463/25 |
| 2013/0342672 A1* | 12/2013 | Gray | ............ | G06F 3/013 348/78 |
| 2015/0256741 A1* | 9/2015 | Towal | ............ | H04N 5/23222 348/222.1 |

OTHER PUBLICATIONS

A novel statistical generative model dedicated to face recognition, by Heusch et al., Idiap research institute, Centre du Parc, Rue Marconi 19, PO Box 592, 1920 Martigny, Switzerland, May 20, 2009.*

Office Action for counterpart Korean Application No. 10-2015-0173732 dated Sep. 21, 2016; 5 pages.

* cited by examiner

AUTOMATIC DETECTION OF FACE AND THEREBY LOCALIZE THE EYE REGION FOR IRIS RECOGNITION

BACKGROUND

The present disclosure relates to an apparatus and an operating method for automatic detection of the face in a digital image and the localization of the eye region thereof. This extracted eye region then presents as a target region for iris recognition.

Electronic products such as a computer or a cellular phone include user's personal information in many cases. Also, the proliferation of electronic commerce using such electronic devices is becoming a modern trend. Thus, these electronic devices need to accurately identify the users. To this end, a method of recognizing a user by using a password and ID has been widely used. However, such a verification method has limitations with respect to personal information protection and anti-hacking. Thus, many alternatives to replace it have been proposed.

The latest trend for identity authentication is the usage of biometric systems which are being now gradually commercialized. A Biometric system has the capability to identify or verify each and every individual correctly by using physiological or behavioral characteristics possessed by the user. Towards this end, iris recognition is at present considered to be one of the best authentication processes available today. Iris recognition is stable and unique, at the same time it is non-invasive, offering unmatched accuracy. For such an iris recognition apparatus, an important inceptive step towards segmenting the iris within the eye is an efficient method for automatic detection of the eye region.

The first step towards finding the eye region corresponding to a face image is automatic detection of the face of an user in a given image. A highly accurate detection rate of the face and/or facial features like eye region is thus critical in the iris recognition apparatus. The problem of face detection has not received a great deal of attention, most research are focused on face recognition assuming that the image containing a single face is already available. Such techniques are unable to detect faces against a complex background where there are multiple occurrences of faces in an image. Automated face detection in a crowd is vital to separate the person from the background. The task is to detect the location and size of a human face irrespective of facial hair, facial expression, illuminating or facial occlusion like eyeglass and separate it from the non-face (which is the background). It is desirable to make use of the data obtained from the face detection process as a target for iris recognition, efficiently and quickly.

SUMMARY

The embodiments given below provide an apparatus for automatically localizing a face and the facial features of a user efficiently and quickly and an operating method thereof.

In one embodiment, the apparatus for recognizing iris includes an image capturing unit to acquire an image of desirable quality; and a control unit which accepts a face image to train a Pseudo 2D Hidden Markov Model (HMM) and generate a HMM Face Model by extracting suitable statistical feature vectors from the given face image.

The control unit is responsible for the training phase of the face image. A face is treated as a two dimensional object present in an image. A pre-defined trained face model may be used in order to identify that part of the image where the face is located.

The control unit processes the given sample face image by extracting the distinctive information from the image. Characteristic features are extracted and produces an efficient set of observation vectors obtained from the 2D-DCT coefficients.

The control unit exploits the naturally occurring sequential structure of a human face by taking the sample face images and dividing the face in a sequence of overlapping horizontal and vertical stripes. The sequence of these stripes are labeled as different states using Pseudo 2D HMM. Each state represents a facial feature like forehead, eye, nose, mouth and chin; further each facial feature is divided into sub-states to represent the sequential structure of that feature. The observation vectors are effectively used in the training of a Pseudo 2D HMM Face model. This HMM face model consists essentially of statistical probabilities representing a human face. The control unit registers this HMM Face model.

In another embodiment, the apparatus uses an operating method which models a directed acyclic graph (DAG) using the Pseudo 2D HMM face model and searches through any given image to detect the faces present in the image; once a face is detected the facial features can be localized. Each node in the DAG describes a state of a Pseudo 2D HMM Face model and the path traced out by the optimal node through this graph represents the faces detected in that image.

The operating method define a set of overlapping blocks which are extracted from the image from left to right and top to bottom. From these blocks, the observation vectors are obtained from the 2D-DCT coefficient and used by our HMM DAG.

As the operating method analyses each observation vector block, the HMM DAG unfolds dynamically and serves as a search space. This search space of the HMM DAG composed of subHMMs corresponding to the Face model, is then used to decode the input data to find the optimal path.

The operating method investigates only that graph node with the maximum probability of state occurrence or highest score thereby reducing the computational cost. The path traced out by this optimum graph node is the optimal path and represents the maximum likelihood state sequence through the HMM DAG which gives the detected faces and facial features.

The details of embodiments are set forth in the accompanying drawings and the description below. Other features will be apparent from the description and drawings, and from the claims.

DETAILED DESCRIPTION OF THE EMBODIMENTS

Figure 1:
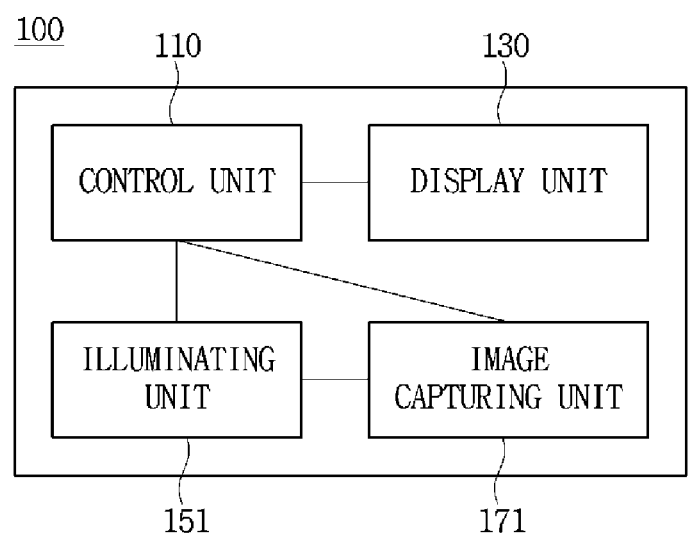
FIG. 1 shows a block diagram of an apparatus to detect face and localize the eye region for recognizing iris according to an embodiment.

Embodiments are described below in detail with reference to the accompanying drawings so that a person skilled in the art may easily practice the present invention. However, the present invention may be implemented in several different forms and is not limited to embodiments that are described herein. In addition, parts having no impact on descriptions are not provided in the drawings in order to make the present invention clear and similar parts throughout the disclosure have similar reference numerals.

Also, when it is described that a part includes some elements, it should be understood that it may not exclude but further include other elements if there is no specific objection.

FIG. 1 shows a block diagram of an apparatus to detect face and localize the eye region for recognizing iris (hereinafter, referred to as an "iris recognizing apparatus") according to an embodiment.

As shown in FIG. 1, the iris recognizing apparatus 100 according to an embodiment includes an Image Illuminating unit 151, an image capturing unit 171, a control unit 110, and a display unit 130.

The Image Illuminating unit 151 radiates an infrared ray to an eye where the iris being a target for iris recognition. In this case, the infrared ray may be a near infrared ray (NIR) between 700 nm and 900 nm. In a particular embodiment, the iris recognizing apparatus 100 may include a plurality of Image Illuminating units.

The image capturing unit 171 collects an image of a user. In particular, the image capturing unit 171 collects images of an eye lit by the Illuminating unit 151. Images collected by the image capturing unit 171 are used for iris recognition. Thus, the image capturing unit 171 needs to collect a high-quality image of a narrow range for iris recognition. Therefore, the image capturing unit 171 may include a lens having a relatively small angle of view. In this case, the image capturing unit 171 may be a camera in a particular embodiment. In another particular embodiment, the image capturing unit 171 may be an image sensor or other devices that may collect images of an eye, in addition to the camera. In a particular embodiment, the image capturing unit 171 may further include an additional image capturing unit that collects an image including a user's eye as a relatively wide range image. In this case, the additional image capturing unit may include a lens having a larger angle of view than the lens used for collecting an image for iris recognition.

The display unit 130 may display an image collected by the image collecting unit 171 and display a user interface.

The control unit 110 controls the operations of the illuminating unit 151, the image capturing unit 171, and the display unit 130. Also, the control unit 110 may localize a face of a user from an image of a user collected by the image collecting unit 171.

The particular operation of the iris recognizing apparatus 100 is described through FIGS. 2 to 6.

Figure 2:
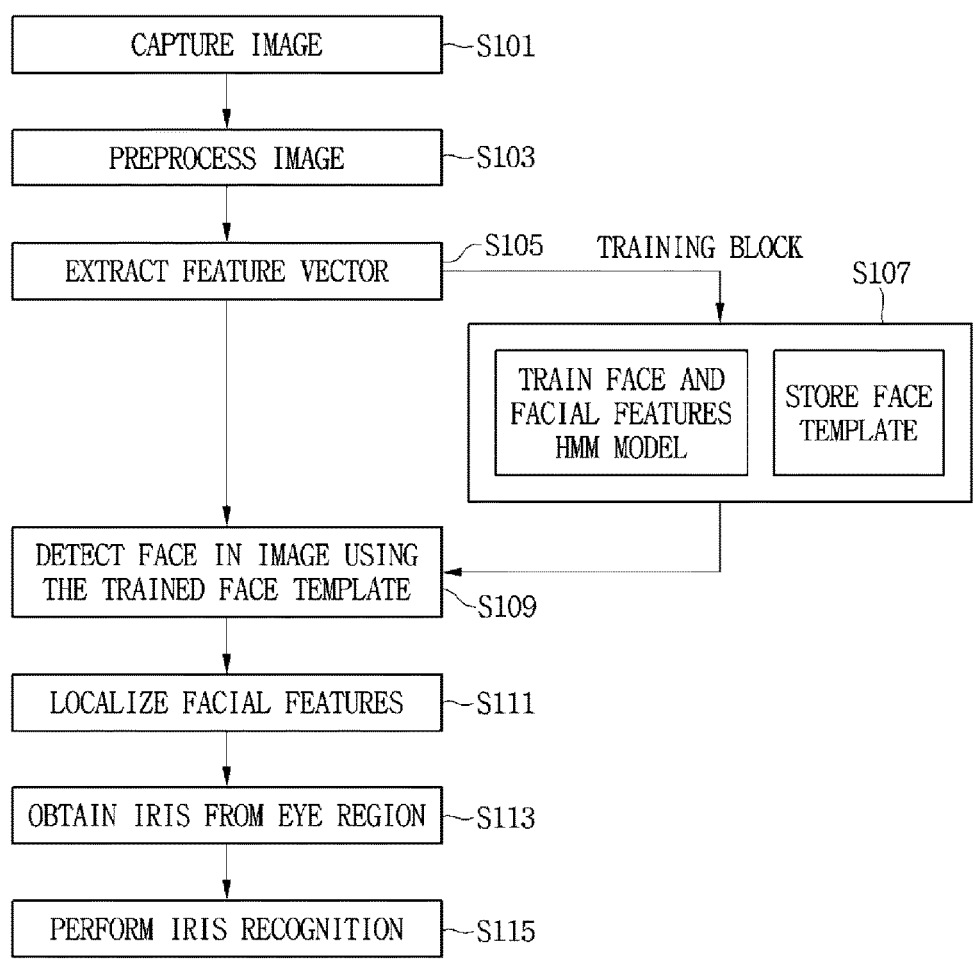
FIG. 2 is a comprehensive flowchart of an operating method for capturing an image, training and detecting the face and its eye region for recognizing iris by an apparatus according to an embodiment.

FIG. 2 is a comprehensive flowchart of an operation for capturing the image, training and detecting the face and its eye region used for recognizing iris by the iris recognizing apparatus according to an embodiment.

The image capturing unit 171 collects an image of a user in step S101.

The control unit 110 localizes a face of a user from the image of the user from step S103 through step S111.

The image captured passes through the pre-processing step S103 where the image is prepared. This image is then used to extract the essential features in step S105.

Step S107 describes a block of events where the extracted image features are used to train a template for a face and facial features. This template is then stored for later use during the detection phase.

The stored face template is utilized by step S109 to detect a face in any digital image. After the face is detected its facial features is localized with special importance to the eye region by the step S111.

The control unit 110 obtains the iris from the eye region in step S113 which is used to perform iris recognition. In particular, in the step S115 the control unit 110 extracts the pattern of iris from an image collected by the image capturing unit 171. Also, the control unit 110 compares the pattern of iris extracted with that of iris stored in a storage unit (not shown) to identify a user. In this case, when the pattern of iris extracted matches with that of iris stored to some extent, the control unit 110 determines that a user having the pattern of iris extracted and a user having the pattern of iris stored are the same people.

The detailed description of the operation of detecting the face and the facial features of the user from the image of the user by the control unit 110 is given through FIGS. 3 to 6.

Figure 3:
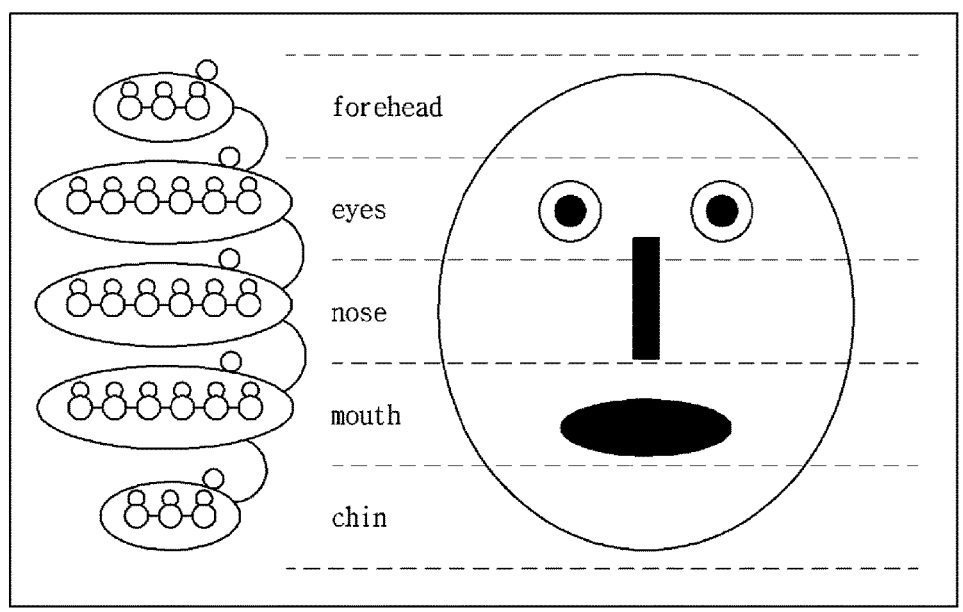
FIG. 3 shows the states of a Hidden Markov Model of a face and the facial features of a user to train an apparatus for recognizing iris according to an embodiment.

FIG. 3 shows a Hidden Markov Model (HMM) of a face of a user which the iris recognizing apparatus learns according to an embodiment.

Hidden Markov Models (HMM) are a set of statistical models used to characterize the statistical properties of a signal. HMM consist of two interrelated process: (a) an underlying, unobservable events with a finite number of states, a state transition matrix and an initial state probability, and (b) a set of probability density functions associated with each state. HMM exploits the fact that the most significant facial features of a frontal face occur in a natural order from top to bottom even if the image undergoes small rotations. Therefore the image of a face may be modeled using an HMM by assigning each facial feature to a HMM state from top to bottom according to the vertical structural information. The facial image is divided into several regions such as forehead, eyes, nose, mouth and chin. Each of these regions is assigned a HMM state. However, each facial feature itself is rich in structural information in the horizontal direction. So it becomes essential to further assign HMM sub-states for each facial feature in the horizontal direction. Thus we define the Pseudo 2D HMM.

The Pseudo 2D HMM is utilized for modeling face images in a hierarchical manner as follows. Several super states corresponding to the vertical facial features, such as forehead, eyes, nose, mouth and chin as illustrated in FIG. 3. Each state within the super state is utilized for modeling the horizontal sequence of the localized feature. The HMM face model consists of 5 super states, each with 6 sub states for eyes, nose and mouth and 3 sub states for forehead and chin. The probabilistic parameters are optimized by experimental results on known sample face images. The HMM model for each sub state is represented by the following equation:

$$\lambda = (A, B, \pi),$$

where A represents state-transition probability distribution, B represents observation symbol probability distribution, and π represents initial-state probability distribution.

Figure 4:
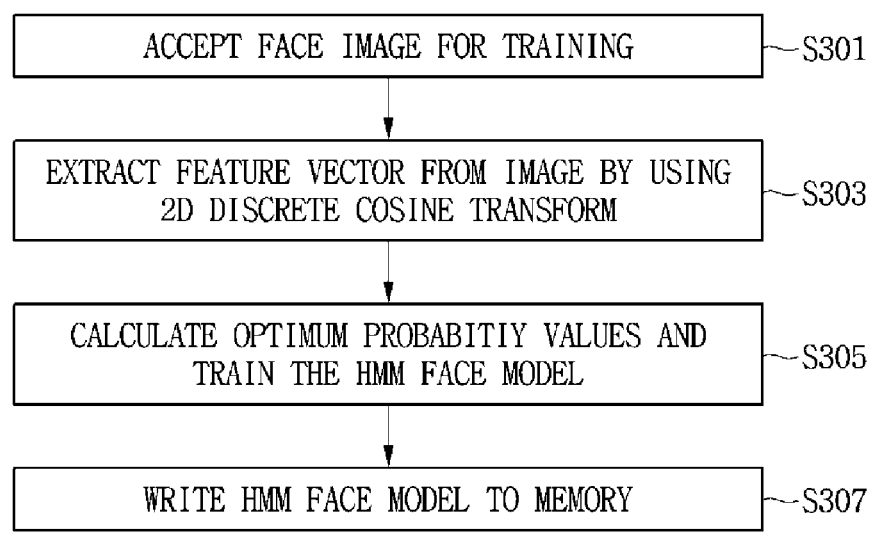
FIG. 4 is a flowchart of an operating method to train a Hidden Markov Model of a face of a user by an apparatus according to an embodiment.

Thus, the Pseudo 2D HMM of the whole face may be formalized via the following description:

$$\Lambda = (\lambda, \overline{A}, \overline{B}, \Pi)$$

where,

λ=a set of N possible super states in the model
$\overline{A}$=set of transition probabilities between super states
$\overline{B}$=set of observation probabilities
Π=initial super state probabilities of the Pseudo 2D HMM FIG. 4 is a flowchart of an operation of learning the HMM of a face of a user by the iris recognizing apparatus according to an embodiment.

The control unit 110 divides a face of a user into super states based on facial features of the face in step S301. In a particular embodiment, the control unit 110 divides the face into five states based on a forehead, eyes, a noise, a mouth, and a chin as described above and each 5 super state into further sub states, with 6 sub states for eyes, nose and mouth and 3 sub states for forehead and chin to form a pseudo 2D HMM face model.

The control unit extracts the numerical features that represent the face as an object in step S303 using 2D discrete cosine transformation. Feature vectors are equivalent to the vector of informational variables. The vector space associated with these vectors is called feature space. To reduce the dimensionality of the feature space, the control unit considers only the eight lower frequencies of the 2D DCT.

The control unit 110 sets a probability value corresponding to each sub state and each super state through learning in step S305. This set of optimal probability values represents the corresponding HMM face model which is then written to memory by step S307.

Figure 5:
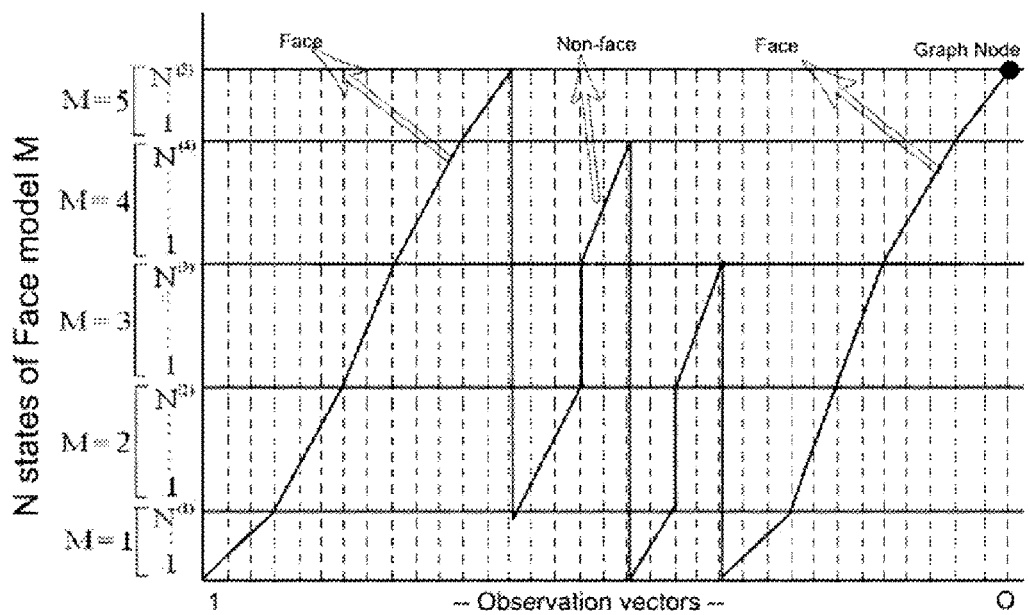
FIG. 5 shows how to explore a face through a directed acyclic graph used by an apparatus for recognizing iris according to an embodiment.

To detect a face, a directed acyclic graph is applied to the Pseudo 2D HMM face model and the optimal path defines the detected face in any given image. Related descriptions are provided through FIG. 5. which shows how to explore a face by using a DAG used by the iris recognizing apparatus according to an embodiment. The HMM DAG is used for efficiently calculating a path that passes through the states of the Pseudo 2D HMM face model. The iris recognizing apparatus 100 use the DAG for localizing a face of a user. In particular, the iris recognizing apparatus 100 calculates a state transition path that includes the states of the HMM. The HMM DAG handles the super and sub states of the Pseudo 2D HMM and serves as the search space. The reference HMM states unfolds as the observation vectors are encountered sequentially. The HMM DAG is composed of the super states of the face and the sub states of each facial feature such that each node in the graph is represented as a HMM state. The input observation data is decoded in this graph to find the optimal path through the search space. This optimal path reveals the faces detected in the given image. The graph in FIG. 5 shows the optimal path decoded by the iris recognizing apparatus 100 to detect the faces present in a given image. The iris recognizing apparatus 100 quickly determines the localization of a face through the DAG. The detailed operations of the iris recognizing apparatus 100 localizing a face of a user is described through FIG. 6.

Figure 6:
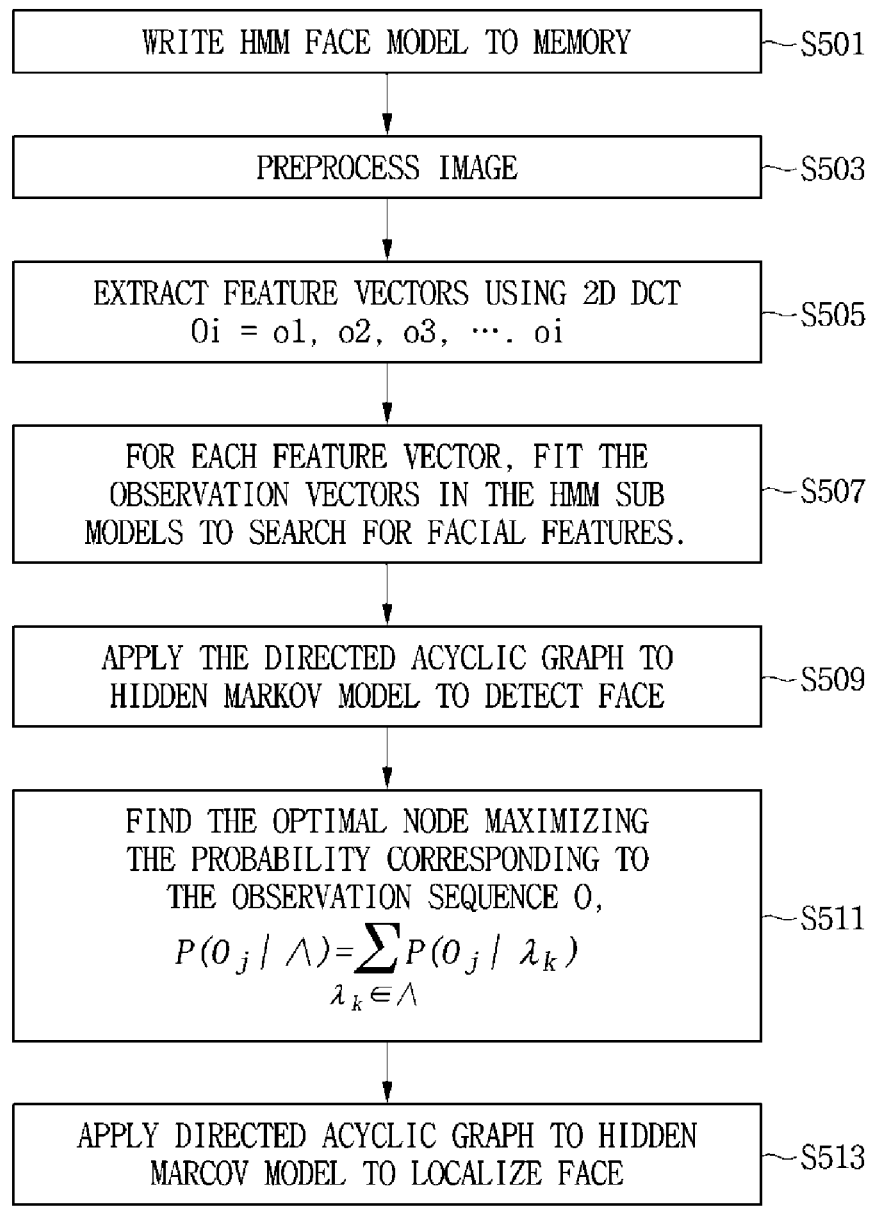
FIG. 6 shows the flowchart describing the steps involved in an operation to detect face and localize its features by an apparatus according to an embodiment.

FIG. 6 shows an operation of localizing a face of a user by the iris recognizing apparatus according to an embodiment.

The image capturing unit 171 collects an image of a user in step S501. This image is then pre-processed in step S503 to enhance the visual appearance of the images and improve the image details.

The control unit 110 extracts characteristic vectors from the image of the user by using 2D discrete cosine transform (DCT) in step S505. In this case, an extracted characteristic vector may be indicated by the following set of observation vectors:

$O_j = o_1, o_2, o_3, \ldots o_N$.

The control unit 110 fits the observation vectors to the Pseudo 2D HMM to search for the characteristics of the face in step S507.

The face is localized by applying the DAG to the HMM in step S509. In particular, given a trained Pseudo 2D HMM face model, we form a HMM DAG by considering every super and sub states of the HMM face model. As we encounter the observation vectors, we move forward along the observation axis and the reference HMM states are unfolded to form the graph G={N, E}, where N is the set of states generated as nodes in the DAG and E is the set of edges between any two states representing the transition probability between the states. Each node in the graph is associated with a probability score that represents the score of a path passing through the node. This probability score of the nodes in step S511 are given by the following expression:

$$P(O_j \mid \Lambda) = \sum_{\lambda_k \in \Lambda} P(O_j \mid \lambda_k)$$

The node maximizing the above probability score is the optimal node, given the HMM state sequence and the trained HMM Face model. The path traced out by this optimal node through the HMM DAG is the optimal path which gives the likelihood of observing the sequence O observation vectors Step S513 gives the optimal path giving the detected face and its facial features. Accordingly, the iris recognizing apparatus 100 may localize a face of a user irrespective of a location at which image exploration has started.

Embodiments provide the iris recognizing apparatus for localizing a face of a user efficiently and quickly and an operating method thereof.

The characteristics, structures, and effects described in the embodiments above are included in at least one embodiment but are not limited to one embodiment. Furthermore, the characteristic, structure, and effect illustrated in each embodiment may be combined or modified for other embodiments by a person skilled in the art. Thus, it would be construed that content related to such a combination and such a variation is included in the scope of the present invention.

Embodiments are mostly described above. However, they are only examples and do not limit the present invention. A person skilled in the art may appreciate that several variations and applications not presented above may be made without departing from the essential characteristic of embodiments. For example, each component particularly represented in embodiments may be varied. In addition, it should be construed that differences related to such a variation and such an application are included in the scope of the present invention defined in the following claims.

What is claimed is:

1. An electronic apparatus for detection of a face to recognize an iris of an eye, the apparatus comprising:

receiving, by an image capturer of the electronic apparatus, a digital image of a user; and extracting, by a controller of the electronic apparatus, a characteristic vector from the image of the user;

fitting, by the controller of the electronic apparatus, the extracted vector into a Pseudo 2D Hidden Markov Model (HMM) to train a face model having a plurality of states, and detect a face and facial features of the user;

wherein the controller applies a directed acyclic graph (DAG) to the Psuedo 2D HMM on the electronic apparatus to localize the face of the user, and determines as localizing the face of the user when a transition path represented on the DAG comprises all of the plurality of states;

wherein the controller calculates the transition path including states of the Psuedo 2D HMM, wherein the directed acyclic graph (DAG) includes super states of the face and sub states of each facial feature such that each node in the directed acyclic graph (DAG) is represented as states of the Psuedo 2D HMM, wherein the each node in the directed acyclic graph (DAG) is associated with a probability score that represents a score of a path passing through the node, wherein the node maximizing the probability score is an optimal node, given a HMM state sequence and a Pseudo 2D HMM trained face model, wherein the controller detects the face of the user, when an optimal path is found through the DAG, wherein a path traced out by the optimal node is the optimal path, wherein a node having the highest probability score is considered as the optimal node for an observation vector sequence.

2. The apparatus according to claim 1, wherein the controller accepts a set of different instance of face samples and extracts observation vectors within a rectangular 4–4 window using eight coefficients over the lowest frequencies in the 2D DCT domain.

3. The apparatus according to claim 1, wherein the controller divides the face from top to bottom vertically into five regions as forehead, eye, nose, mouth and chin assigning each region to a Pseudo 2D HMM super state.

4. The apparatus according to claim 3, wherein the controller further divides each super state into sub state to preserve horizontal structural information of the face.

5. The apparatus according to claim 4, wherein the controller determines the HMM to depict a face as a two-dimensional observation sequence such that the face is comprised of a global (vertical) model represented by 5 states—the forehead, the eyes, the nose, the mouth and the chin; and local (horizontal) sub-models one for each facial feature with three states for the forehead and the chin, the six states for the eyes, nose and mouth.

6. The apparatus according to claim 5, wherein the Pseudo 2D HMM is achieved by using two-nested one-dimensional evaluations with respect to each of the observation sequences.

7. The apparatus according to claim 6, wherein the Pseudo 2D HMM is trained as a face model by evaluating the most likely state sequence which corresponds to the observation sequence of a known face structure by using dynamic programming procedures.

8. An electronic apparatus implemented operating method for detection of a face to recognize an iris of an eye, the operating method comprising:

receiving, by the electronic apparatus, a digital image of a user;

extracting, by the electronic apparatus, a characteristic vector from the digital image of the user received by the electronic apparatus;

fitting, by the electronic apparatus, the characteristic vector to an Pseudo 2D Hidden Markov Model (HMM), on the electronic apparatus, having a plurality of states; and detecting, by an image capturer of the electronic apparatus, a face of the user;

wherein the detecting of the face of the user by the image capturer of the electronic apparatus comprises applying a directed acyclic graph (DAG) to the Pseudo 2D HMM on the electronic apparatus to detect the face of the user; and wherein the applying of the DAG to the Pseudo 2D HMM on the electronic apparatus to detect the face of the user comprises determining detecting the face of the user when a transition path represented on the DAG comprises all of the plurality of states, wherein the applying of the DAG to the Pseudo 2D HMM on the electronic apparatus to detect the face of the user comprises calculating the transition path including states of the Psuedo 2D HMM, wherein the directed acyclic graph (DAG) includes super states of the face and sub states of each facial feature such that each node in the directed acyclic graph (DAG) is represented as states of the Psuedo 2D HMM, wherein the each node in the directed acyclic graph (DAG) is associated with a probability score that represents a score of a path passing through the node, wherein the node maximizing the probability score is an optimal node, given a HMM state sequence and a Pseudo 2D HMM trained face model, wherein the applying of the DAG to the Pseudo 2D HMM trained face model to localize the face of the user comprises detecting the face of the user, when an optimal path is found through the DAG, wherein a path traced out by the optimal node is the optimal path, wherein a node having the highest probability score is considered as the optimal node for an observation vector sequence.

9. The operating method according to claim 8, wherein the determining the face of the user comprises decoding the observation vector sequence to evaluate a score of a path passing through any graph node, wherein the score of the node is the probability of observing the observation sequence of given Pseudo 2D HMM state sequence and the Pseudo 2D HMM trained face model.

* * * * *